Patented Aug. 30, 1932

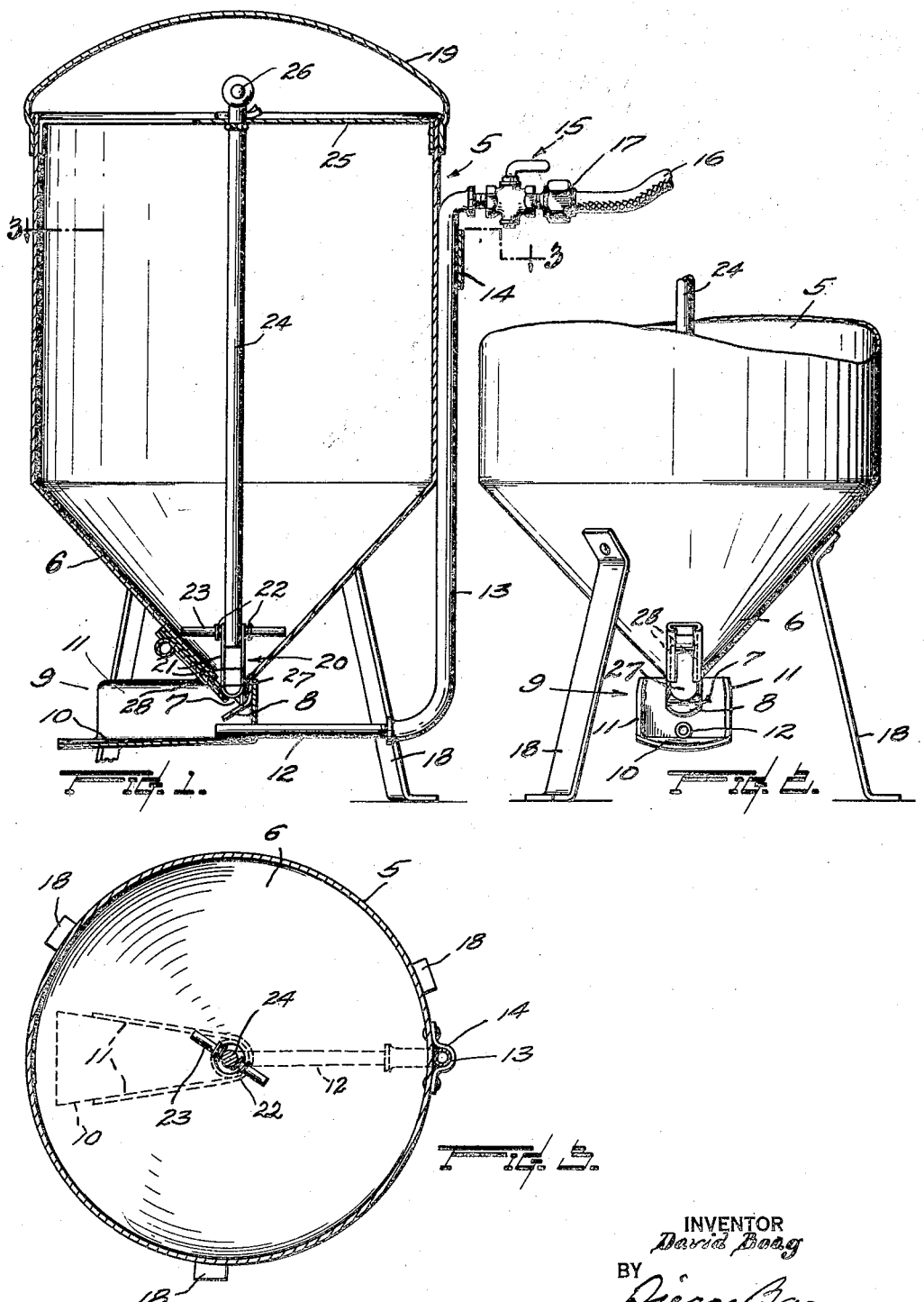

1,873,992

UNITED STATES PATENT OFFICE

DAVID BOAG, OF SEATTLE, WASHINGTON

FERTILIZER SPRINKLER

Application filed June 3, 1929. Serial No. 367,957.

This invention relates to that class of agricultural appliances which is utilized for the distributing or spreading of pulverized or comminuted material—such as fertilizer over the ground.

The object of the invention, generally, is to provide apparatus which will accomplish the above mentioned and similar operations by means of ejecting devices actuated by a stream of water.

More specific objects and advantages of the invention will appear in the following description.

The invention consists in the novel construction, adaptation, and combination of parts hereinafter described and claimed.

In the accompanying drawing,—

Figure 1 is a view partly in side elevation and partly in transverse vertical section of apparatus embodying the present invention; Fig. 2 is a front elevational view of the lower portion of the apparatus illustrated in Fig. 1; and Fig. 3 is a horizontal section on line 3—3 of Fig. 1.

In said drawing the reference numeral 5 represents a tank having a funnel shaped portion 6 terminating in a relatively small spout 7 disposed in the vertical axis of the tank. Extending in an inclined direction forwardly and downwardly from the spout 7 is an apron 8 which serves to baffle the delivery of material from the tank spout and cause the material to be discharged forwardly as it is delivered by gravitation from the spout. Located below said spout and rigidly secured thereto is a pan 9 having a substantially horizontally disposed floor 10 extending between relatively diverging side walls 11.

Extending horizontally, or nearly so, into the rear of the pan 9 is the nozzle element 12 of a water pipe 13.

The nozzle 12 and pipe 13 are secured to the tank as by soldering or other suitable known means such, for example, as a strap 14.

15 represents a valve for regulating the supply of water received from a service pipe (not shown) through the medium of a flexible tube, or hose, 16 which may be detachably connected as by means of a union-coupling 17 to pipe connection 13.

18 represents legs upon which the tank and associated parts are supported and 19 is a handle or bail secured to the upper end of the tank.

Material for distribution is supplied in a dry state into the tank 5, descending therein by gravitation and likewise through the funnel 6 to escape from the spout 7 onto the apron 8.

For operation, the valve 15 is opened for the delivery of water through the nozzle 12 into and through the pan 9, the water is thus delivered across the axis of the tank discharge opening and performs two functions: first, to produce a suction at the spout 7 whereby the delivery of the material into the pan is facilitated and, second, to provide in the stream of water a means for conveying and delivering the material in a fan-like manner horizontally to distribute material over a large area of ground.

The weight of the apparatus is small and of light weight enabling it to be readily carried about and suitably directed.

To ensure the operation of the apparatus it is necessary to maintain the spout free of obstructions for the delivery of material from the tank 5. To which end I provide within the spout an agitator 20 consisting of a piece of wire which is bent to a U-shape, the arms 21 of which have their extremities coiled, as at 22, about a transversely arranged bar element 23 extending horizontally through the lower end of a supporting rod 24 which is rotatable in and depending from the central portion of a bar element 25 forming a part of the tank structure.

The rod 24 is located axially of the tank and is manually rotatable by means of a handle bar 26 provided in the upper end of the rod and above the material-receiving space of the tank, permitting the operator using his hand to rotate or shake the rod, the agitator and the bar element 23 as may be required to break up accumulations within the spout 7.

The agitator 20 is of especial benefit in imparting a stirring action within the spout 7.

The amount of material delivered through the spout 7 is, moreover, regulated by means of a finger controlled shutter 27 movable in guide ways 28 provided upon the underside of the tank structure to close more or less the effective opening of the spout.

In operation, the abrasive action of the stream of water delivered upon the pan floor 10 imparts a vibratory action to the lower end of the tank with respect to the agitator which is hung by means of the rod 24 from the bar 25 which is secured to the upper portion of the tank, whence a succession of impulses is afforded to shake the material downwardly through the tank's spout.

The invention is convenient to use and is particularly valuable for use in applying fertilizing and "greening" materials or mixtures to gardens, lawns, etc.

What I claim, is,—

1. In spraying apparatus, the combination with a material containing receptacle, a pan therebelow, a spout disposed at the lower extremity of said receptacle for discharging the material therefrom to said pan, and means to regulate the effective size of the spout opening, of a water supply pipe projecting beyond the outlet opening of the spout in the direction of water flow, means to project a stream of water from said supply pipe across said pan to impregnate the material and discharge the same from the device, and means to agitate the material in said receptacle.

2. In a device of the character described, in combination, a tank having a funnel-shaped lower portion terminating in a spout for the discharge of material from the tank, the rear wall of said spout projecting forwardly and downwardly to serve as an apron for directing the discharge of the material, a pan located below said spout and projecting forwardly of the same in an approximate horizontal plane, a service pipe, and a nozzle therefor adapted to discharge a stream of water across the material being discharged from the apron, said nozzle being disposed between said pan and apron and projecting a short distance forwardly of the lip portion of the latter to prevent saturation of the material prior to its discharge therefrom.

3. The method of spraying a dry material in a water-saturated state, which consists in producing a stream of water under pressure to have the same flow in an approximate horizontal plane, and gravitationally feeding the dry material with the discharge point of the same slightly rearwardly of the discharge point of the water into the stream of water at an inclination in the direction of flow of the same.

4. The method of spraying a dry material in a liquid-saturated state, which consists in producing a stream of liquid under pressure to have the same flow in an approximate horizontal plane, and feeding the dry material into the stream with the point of discharge of the material slightly rearwardly of the point of discharge of the stream.

5. In a device of the character described, in combination, a tank having a funnel-shaped lower portion terminating in a spout for the discharge of material from the tank, a pan located below said spout, said pan having an approximately horizontally disposed forwardly diverging fan-shaped floor portion and side walls projecting upwardly from lateral edges of said floor portion, an apron inclined downwardly and forwardly from the rear wall of the spout for directing the delivery of material from the spout, the water supply pipe, a nozzle therefrom projecting over said pan floor and terminating forwardly of the lower lip portion of said apron, and means to control the force of a stream of water issuing from said nozzle.

Signed at Seattle, Washington, this 10th day of May, 1929.

DAVID BOAG.